Figure 1:
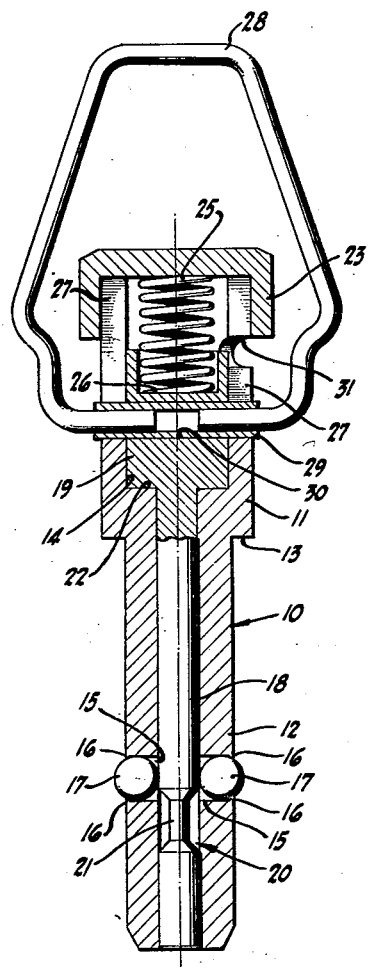

Dec. 17, 1957 E. BACHMAN 2,816,471
CLEVIS PIN WITH LOCKABLE OPERATING MEANS
Filed May 18, 1954

INVENTOR.
EUGENE BACHMAN
BY
*Naylor and Lassagne*
ATTORNEYS

United States Patent Office 2,816,471
Patented Dec. 17, 1957

2,816,471

CLEVIS PIN WITH LOCKABLE OPERATING MEANS

Eugene Bachman, San Fernando, Calif., assignor to D. W. Price Corporation, Los Angeles, Calif., a corporation of California Application May 18, 1954, Serial No. 430,478

2 Claims. (Cl. 85—5)

The present invention relates to a clevis pin of the type adapted to be used as a temporary locking device and, more particularly, to certain new and useful improvements in clevis pins of the type illustrated in Meepos et al. Patent No. 2,779,228 dated January 29, 1957, and Bachman Patent No. 2,786,383 dated March 26, 1957.

As disclosed in the above-noted pending applications, clevis pins of the so-called "automatic" type are not broadly new and many such pins have been devised and constructed which carry near their ends a lock part that is inwardly and outwardly movable, in response to an actuating means, at the will of the user to permit the pin to be inserted into a hole formed in one or more plates constituting a clevis, and to be withdrawn from such clevis hole when and as desired and reused. For example, as illustrated in the aforesaid Bachman patent, the construction of the clevis pin is such that when the stem 19 is pressed into the tube 10 through movement of the actuating lever 26 to extend in axial alignment with the stem, the low part 22 of the stem cam is moved adjacent the locking elements or balls 17 which are thus permitted to move inwardly in a radial direction so as not to protrude beyond the exterior of the tube shank, to permit the tube and locking elements to be manually introduced into a clevis hole; whereafter the lever 26 is then rocked to a second position in which it extends at a right angle to the stem, to permit the clevis pin to be forcefully driven through the clevis. When the end of the tube and the balls 17 are through the clevis, the balls 17 are then, through the action of the spring 24, automatically forced to protrude radially from the tube by the return of the stem 19 to its normal position thereby locking the clevis pin in the hole. In order to remove the clevis pin from the clevis hole, the lever 26 is again moved to extend in axial alignment with the stem to release the locking elements which movement may be effected simultaneously with the withdrawal of the clevis pin.

The object of the present invention is to provide an improved clevis pin of the above-described type in which the means for actuating the stem is capable, at the will of the user, of locking the stem in non-ejecting relation to the locking elements and is adapted to permit the pin to be operated, when it is to be inserted into a clevis, optionally either by manual operation of the operating means during introduction of the pin into the clevis, or, if desired, by locking the stem in non-ejecting relation to the locking member to permit the use of force both with respect to the introduction of the pin into the clevis and in the subsequent forcing of the pin through the clevis, when so inserted.

To this end, the present invention contemplates the provision of an improved actuating means comprising, in combination, a spring carried within the head end of the tubular member between a capping member on the end thereof and the end of a rotatable stem slidably disposed within the tubular member, adapted to normally urge an annular camming portion of the stem into ejecting engagement with the usual locking element carried in the opposite end of the tubular member; an actuating handle pivotally carried by the end portion of the stem slidable within the head end of the tubular member, extending externally of the tubular member through a longitudinally disposed slot in the head end thereof, and operable in such slot to move the stem against the urge of the spring to bring the camming portion into non-ejecting engagement with the locking element; and means for selectively engaging the actuating handle when the stem is moved into non-ejecting relation to the locking element and adapted, in combination with and upon pivotal movement of the actuating handle, to permit the optional use of force during the initial introduction of the locking element end of the tubular member into the clevis hole. The means for locking the stem in non-ejecting relation to the locking element comprises in accordance with the preferred embodiment of the invention, a bayonet slot in the head end of the tubular member which is connected to the longitudinally disposed slot adjacent its outer end such that the actuating handle, when moved to bring the stem in non-ejecting relation to the locking element and then rotated with respect to the tubular member, will be engaged in the bayonet slot and will thus prevent the spring from returning the stem to its normal position.

As will be apparent from the foregoing construction, the clevis pin according to the present invention is adapted for convenient operation under the most varied conditions of use in that it may be simply and easily introduced into a clevis hole either by holding the actuating handle and pushing on the capping member to manually insert the pin in the clevis, or optionally, by rotating the actuating handle when moved to bring the locking stem into non-ejecting relation to the locking element, to engage the actuating handle in the bayonet slot, after which the actuating handle is then released and pivoted to permit the use of force to introduce the pin into the clevis hole. After the pin has been driven into the clevis hole to a point where the locking elements will be engaged by the wall of the clevis hole, the actuating handle may be rotated in the opposite direction to permit the urge of the spring to tend to return the stem to ejecting position, such that when the locking element is completely driven through the clevis hole, the clevis pin will be automatically locked therein.

Figure 2:
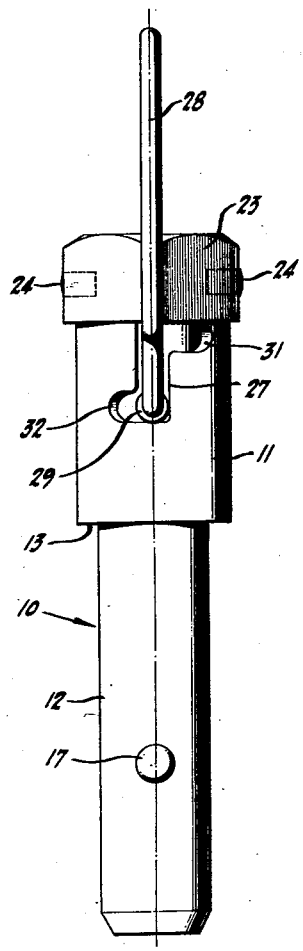

The above as well as other novel features of the clevis pin according to the present invention will be more readily understood from the following description of the accompanying drawings, in which drawings:

Figure 1 is a longitudinal sectional view of a clevis pin constructed according to the preferred embodiment of the invention; and Figure 2 is a side view of a clevis pin showing a further embodiment of the invention.

Referring to Figure 1 of the drawings, the clevis pin according to the preferred embodiment of the invention illustrated includes a tubular member 10 having a head 11 at one end which, in relation to the shank 12 of the tubular member, provides a work engaging shoulder 13. The head 11 is provided with a counter bore 14, and near the point of the shank 12 of the tubular member there are formed one or more radial apertures or holes 15, each having a restricted outer portion 16 formed therein as by peening or staking the exterior of the shank 14 adjacent each opening. In each hole 15, there is placed a ball 17 which is radially movable in its hole from an outer position where a portion of the ball protrudes beyond the exterior of the shank, the ball being prevented from further outward movement by the restricted portions 16, to an inner position where it does not protrude.

For selectively moving the balls 17 between the ejecting and non-ejecting positions, a stem 18 is slidably disposed within the tubular member 10, and is provided at one end with an enlarged head portion 19 which is slidable within the counterbore 14, and at the other end a camming portion, generally designated as 20, which is slidable in adjacent relationship with respect to the radial holes 15. The cam portion 20 is formed in the stem 18 by recessing or necking an annular portion of the stem, as at 21, in such a manner that the recess will act as a low point, or cam fall. As is apparent, when the stem 18 is moved in an axial and outward direction within the tubular member 10 as to bring the cam fall 21 adjacent the wall openings of the radial holes 15, the balls 17 will be free to move inwardly to a position where they do not protrude; and when returned to seat the stem head 19 on the shoulder 22, the balls 17 will again be ejected by the shank of the stem 18 so as to protrude beyond the exterior of the shank of the tubular member 10.

A capping member 23 is secured to the end of the head 11 in a suitable manner, as for example by means of the screws 24 (see Fig. 2), which capping member serves to retain the stem 18 within the tubular member 10, and to provide, as will be described hereinafter, a finger operating surface when the clevis pin is to be manually introduced into a clevis hole, or as a working surface to permit the use of force to introduce the clevis pin into a clevis hole.

In accordance with the present invention, a compression spring 25 is positioned within the bore 14 between the inner face of the capping member 23 and a counterbored seat 26 provided in the head 19 of the stem, serving, as will be observed, to normally urge the stem 18 in an inward direction in the tubular member 10 to maintain the shank of the stem 18 in ejecting engagement with the balls 17. For the purpose of actuating the stem 18, the head 11 of the tubular member 10 is provided with oppositely disposed longitudinally extending slots 27 and a ring shaped actuating member 28 is pivotally mounted in the manner shown through such slots to the head 19 of the stem by means of the sleeve 29 which extends through the slots 27 and the transverse aperture 30 in the stem head 19. With the parts in their normal position as shown in Figure 1 when the handle 28 is grasped and the capping member 23 pushed, as with the thumb, the stem 18 will be moved in an outward direction against the urge of the spring 25 and the cam fall 21 will be moved adjacent the apertures 15, thus permitting the balls 17 to move inwardly to a position where they do not project beyond the circumference of the tublular shank 12. In this manner, the clevis pin can by such convenient finger operation be simply and easily introduced into a clevis hole.

On occasions, however, it is necessary to forcefully introduce the clevis pin into the clevis hole and for this purpose means are provided for locking the stem 18 in non-ejecting relation to the balls 17. As shown, such means comprise bayonet sockets 31 which extend at substantially right angles from the longitudinal slots 27 and are adapted to be engaged by the sleeve 30, when the stem 18 is moved outwardly in the tubular member 10 in the above-described manner, and then rotated. In such position, the balls 17 will be freely movable inwardly and, when the end of the actuating handle is pivoted away from the capping member 23, the clevis pin may be forcefully introduced into the clevis hole, as for example, by blows on the capping member 23. After the clevis pin has been inserted into the clevis hole to such an extent that the wall of the clevis hole will retain the balls 17 in their inward position, the actuating handle 28 may then be rotated in the opposite direction such that when the shoulder 13 is engaged by the clevis, the balls 17 will be automatically ejected by the spring 25 returning the pin 18 to its normal position.

As shown in Figure 2, the actuating means may also include second bayonet sockets 32 which extend in a counterclockwise direction to the bayonet sockets 31, from the inner ends of the longitudinal slots 27. In accordance with this further embodiment, when the clevis pin is inserted in the clevis and "automatically" locked by the return of the parts to their normal position in which the stem 18 is positioned in ejecting relation to the locking elements 17, the clevis pin may further be "locked" by rotation of the handle 28 to engage the bayonet sockets 32, to prevent accidental displacement of the actuating handle 28 through vibration, or otherwise.

What is claimed is:

1. The combination with a clevis pin of the character described including a tubular member having a head at one end adapted to limit movement of said member into a clevis, an enlarged bore in the head of said tubular member and at least one radial aperture in the end opposite said head, a locking element radially movable in said aperture from a position in which it extends beyond the periphery of the tubular member to a position within the periphery of said member, a rotatable stem slidably disposed in said tubular member having a camming portion at one end adjacent said locking element and a head at the other end slidable within said enlarged bore, and a capping member mounted on the head end of said tubular member; of means adapted to slidably actuate the stem in the tubular member when the clevis pin is inserted in and removed from a clevis comprising a spring carried within the enlarged bore between the head of the stem and the capping member for normally urging the camming portion into ejecting engagement with the locking element oppositely disposed longitudinally extending slots in said head end of the tubular member, said slots being provided with bayonet portions adjacent their outer ends, and a ring shaped actuating handle connected to said stem and pivotally mounted on an axis diametrical of the head of said stem through said slots and movable on said pivotal mounting into and out of a position overlying said capping member; said handle being operable in said slots to move said stem in an outward direction against the urge of said spring to bring the camming portion into non-ejecting engagement with said locking element, whereby the clevis pin may be operated when it is to be inserted into a clevis optionally either by holding the actuating handle and pushing on the capping member for manual insertion of the pin in the clevis, or by rotating the actuating handle when the stem is moved in an outward direction to lock said stem in non-ejecting relation to said locking elements, to permit said clevis pin to be forcefully introduced in the clevic, and when it is to be withdrawn from the clevis by a direct pull on said actuating handle.

2. The clevis pin according to claim 1 wherein bayonet sockets are provided at the inner ends of the longitudinally extending slots, adapted, upon rotational movement of the actuating handle, to lock said actuating handle when the stem is in ejecting engagement with the locking elements.

References Cited in the file of this patent

UNITED STATES PATENTS

| 288,731 | Paradise | Nov. 20, 1883 |
| 543,450 | Oettinger et al. | July 23, 1895 |
| 1,106,159 | Rawlins | Aug. 4, 1914 |
| 1,770,751 | Hall | July 15, 1930 |
| 1,923,025 | Morse et al. | Aug. 15, 1933 |
| 2,373,083 | Brewster | Apr. 3, 1945 |
| 2,779,228 | Meepos et al. | Jan. 29, 1957 |

FOREIGN PATENTS

| 555,374 | Great Britain | Aug. 19, 1943 |